US009363802B2

(12) United States Patent
Sun et al.

(10) Patent No.: US 9,363,802 B2
(45) Date of Patent: Jun. 7, 2016

(54) PARALLEL SCHEDULING IN A CELLULAR COMMUNICATIONS SYSTEM

(75) Inventors: Ying Sun, Sundbyberg (SE); Patrick Sheehy, Sollentuna (SE); Stefan Tjärnlund, Jarfalla (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 143 days.

(21) Appl. No.: 14/384,989

(22) PCT Filed: Mar. 15, 2012

(86) PCT No.: PCT/IB2012/051254
§ 371 (c)(1),
(2), (4) Date: Dec. 16, 2014

(87) PCT Pub. No.: WO2013/136135
PCT Pub. Date: Sep. 19, 2013

(65) Prior Publication Data
US 2015/0110019 A1    Apr. 23, 2015

(51) Int. Cl.
*H04W 72/04*    (2009.01)
*H04W 74/00*    (2009.01)
*H04W 72/08*    (2009.01)
*H04W 72/12*    (2009.01)

(52) U.S. Cl.
CPC ........ *H04W 72/0413* (2013.01); *H04W 72/048* (2013.01); *H04W 74/004* (2013.01); *H04W 72/046* (2013.01); *H04W 72/085* (2013.01); *H04W 72/1231* (2013.01); *H04W 72/1247* (2013.01)

(58) Field of Classification Search
CPC .......... H04W 72/0413; H04W 72/048; H04W 72/046; H04W 72/04; H04W 72/1247; H04W 72/1231; H04W 72/085; H04W 74/004

USPC .................................................. 370/329–331
See application file for complete search history.

(56) References Cited

U.S. PATENT DOCUMENTS

| 8,295,370 | B2 * | 10/2012 | Thurfjell | H04L 1/0003 370/329 |
| 2005/0096061 | A1 * | 5/2005 | Ji | H04W 16/02 455/450 |
| 2005/0096062 | A1 * | 5/2005 | Ji | H04W 16/02 455/450 |
| 2008/0232284 | A1 * | 9/2008 | Dalsgaard | H04W 72/042 370/310 |
| 2009/0207784 | A1 * | 8/2009 | Lee | H04B 7/063 370/328 |
| 2012/0052894 | A1 * | 3/2012 | Manssour | H04W 72/121 455/509 |
| 2013/0029629 | A1 * | 1/2013 | Lindholm | H04W 36/0022 455/404.1 |

OTHER PUBLICATIONS

International Search Report and Written Opinion for PCT/IB2012/051254 mailed Nov. 27, 2012, 10 pages.
International Preliminary Report on Patentability for PCT/IB2012/051254 mailed Sep. 25, 2014, 7 pages.

* cited by examiner

*Primary Examiner* — Afsar M Qureshi
(74) *Attorney, Agent, or Firm* — Withrow & Terranova, PLLC

(57) ABSTRACT

Mechanisms for scheduling uplink transmissions for a plurality of user equipment devices, UEs, that are serviced by a network node having a wireless coverage area comprising a plurality of sectors is disclosed. A plurality of schedulers is initiated in parallel, each scheduler corresponding to a different sector of the plurality of sectors. Each scheduler schedules in parallel at least some UEs that are associated with the corresponding different sector.

25 Claims, 15 Drawing Sheets

|  | SECTOR 1 | SECTOR 2 | SECTOR 3 | SECTOR 4 | |
|---|---|---|---|---|---|
| UE1 | 1 | 0 | 0 | 0 | ← 32-1 |
| UE2 | 0 | 1 | 0 | 0 | ← 32-2 |
| UE3 | 1 | 1 | 0 | 0 | ← 32-3 |
| UE4 | 0 | 0 | 1 | 0 | ← 32-4 |
| UE5 | 1 | 0 | 0 | 0 | ← 32-5 |
| UE6 | 1 | 0 | 0 | 1 | ← 32-6 |
| UE7 | 0 | 0 | 0 | 1 | ← 32-7 |
| UE8 | 0 | 1 | 0 | 0 | ← 32-8 |
| UE9 | 0 | 0 | 0 | 1 | ← 32-9 |
| UE10 | 0 | 0 | 1 | 0 | ← 32-10 |
| UE11 | 0 | 1 | 1 | 0 | ← 32-11 |

*FIG. 6*

|  | UE1 | UE2 | UE3 | UE4 | UE5 | UE6 | UE7 | UE8 | UE9 | UE10 | UE11 |
|---|---|---|---|---|---|---|---|---|---|---|---|
| SECTOR 1 | P |  | P |  | P | P |  |  |  |  |  |
| SECTOR 2 |  | P | S |  |  |  |  | P |  |  | P |
| SECTOR 3 |  |  |  | P |  |  |  |  |  | P | S |
| SECTOR 4 |  |  |  |  |  | S | P |  | P |  |  |

*FIG. 7*

|  | SECTOR 1 | SECTOR 2 | SECTOR 3 | SECTOR 4 | $w^R{}_{UE}$ | $wQoS_{UE}$ | $w_{UE}$ |
|---|---|---|---|---|---|---|---|
| UE1 | 1 | 0 | 0 | 0 | 1 | 1 | 11 |
| UE2 | 0 | 1 | 0 | 0 | 1 | 7 | 17 |
| UE3 | 1 | 1 | 0 | 0 | 2 | 9 | 29 |
| UE4 | 0 | 0 | 1 | 0 | 1 | 4 | 14 |
| UE5 | 1 | 0 | 0 | 0 | 1 | 3 | 13 |
| UE6 | 1 | 0 | 0 | 1 | 2 | 3 | 23 |
| UE7 | 0 | 0 | 0 | 1 | 1 | 8 | 18 |
| UE8 | 0 | 1 | 0 | 0 | 1 | 6 | 16 |
| UE9 | 0 | 0 | 0 | 1 | 1 | 9 | 19 |
| UE10 | 0 | 0 | 1 | 0 | 1 | 5 | 15 |
| UE11 | 0 | 1 | 1 | 0 | 2 | 5 | 25 |

FIG. 8

|  | $W_{UE}$ | SECTOR |
|---|---|---|
| UE3 | 29 | 1,2 |
| UE11 | 25 | 2,3 |
| UE6 | 23 | 1,4 |
| UE9 | 19 | 4 |
| UE7 | 18 | 4 |
| UE2 | 17 | 2 |
| UE8 | 16 | 2 |
| UE10 | 15 | 3 |
| UE4 | 14 | 3 |
| UE5 | 13 | 1 |
| UE1 | 11 | 1 |

| ITERATION | 1 | 2 | 3 | 4 |
|---|---|---|---|---|
| SECTOR 1 | UE6 56A-1 | UE3 56B-1 | UE5 56C-1 | UE1 56D-1 |
| SECTOR 2 | UE11 56A-2 | NA 56B-2 | UE2 56C-2 | UE8 56D-2 |
| SECTOR 3 | NA 56A-3 | UE10 56B-3 | UE4 56C-3 | |
| SECTOR 4 | NA 56A-4 | UE9 56B-4 | UE7 56C-4 | |

*FIG. 14*

PARALLEL SCHEDULING IN A CELLULAR COMMUNICATIONS SYSTEM

This application is a 35 U.S.C. §371 national phase filing of International Application No. PCT/IB2012/051254, filed Mar. 15, 2012, the disclosure of which is incorporated herein by reference in its entirety.

FIELD OF THE DISCLOSURE

The present disclosure relates generally to communications systems, and in particular to parallel scheduling devices for transmission in a cellular communications system.

BACKGROUND

A base station has a finite number of resource units, such as scheduling blocks, which may be allocated for uplink transmission by user equipment devices (UEs) in the coverage area of the base station. The effective number of available scheduling blocks may be increased by deploying multiple antennae to spatially divide the service area into multiple sectors. The spatial separation of UE devices in different sectors frequently allows the base station to schedule different UEs in different sectors to use the same scheduling blocks for uplink transmission without fear of interference. For example, where scheduling blocks are defined in terms of frequencies, two UE devices that are sufficiently spatially separated in two different sectors may be assigned the same frequency and time slot for uplink transmission without fear of the concurrent uplink transmissions substantially interfering with one another.

Conventionally, a base station sequentially schedules the UEs that require an uplink transmission within the coverage area of the base station. For each such UE, a number of determinations must be made, including identifying the most appropriate part of the frequency spectrum to use for the transmission, which modulation and coding scheme to use for the transmission, and which scheduling blocks will be allocated for the transmission. These determinations utilize clock cycles of the base station's processor, and in those situations where a number of UEs are waiting to be scheduled, latency can become a limiting factor in maximizing the traffic capacity in the coverage area.

SUMMARY

The present disclosure relates to the parallel scheduling of user equipment devices (UEs) for uplink transmissions. A network node with multiple processing units has a coverage area that is divided into a plurality of sectors. The network node may concurrently, in parallel, schedule UE devices in each sector for uplink transmissions, maximizing the traffic capacity of the coverage area.

Generally, the network node initiates a plurality of schedulers in parallel. Each scheduler of the plurality of schedulers corresponds to a different sector of the plurality of sectors. Each scheduler schedules in parallel at least some UEs that are associated with the different sector to which the scheduler corresponds.

In particular, in one embodiment, the network node identifies one or more of the UEs as multi-sector UEs that are associated with multiple sectors. The network node identifies other UEs as single-sector UEs that are each associated with a single sector. The UEs that are identified as single-sector UEs are scheduled in parallel by the scheduler that corresponds to the sector with which the UEs are respectively associated. The UEs may first be prioritized based on a desired criterion, or criteria, and scheduled by such schedulers in priority order.

Each multi-sector UE may have a primary association with one sector and a secondary association with a second sector. The network node may schedule the multi-sector UEs prior to scheduling the single-sector UEs in parallel. The multi-sector UEs may be scheduled sequentially, or may be scheduled in parallel. In particular, any group of two or more multi-sector UEs, each of which has no association with any sector with which any of the other two or more multi-sector UEs has an association may be scheduled in parallel.

Each sector has an associated scheduling unit group comprising a plurality of scheduling units to which UEs may be allocated. The scheduling units in one sector may correspond to the scheduling units in one or more of the other sectors. For example, the scheduling units may be based, at least in part, on particular frequencies, and the scheduling units associated with one sector may be based on the same frequencies as the scheduling units associated with other sectors. When scheduling a multi-sector UE, a first scheduling unit that is in a first scheduling unit group that is associated with the primary sector of the multi-sector UE is marked as being allocated to the multi-sector UE. Subsequently, when the scheduler that corresponds to such primary sector schedules the single-sector UEs associated with such sector, the scheduler determines that the first scheduling unit is not available for allocation to any single-sector UE. Additionally, when the multi-sector UE is scheduled, a second scheduling unit in a second scheduling unit group that is associated with the secondary sector is also marked as being unavailable for allocation. The second scheduling unit corresponds to the first scheduling unit. For example, the second scheduling unit may be the same frequency as the first scheduling unit. Marking the corresponding scheduling units as being unavailable for allocation to another UE facilitates spatial division multiplexing for multi-sector UEs.

Channel quality indicators which identify the channel quality of a UE in each sector may be used to determine whether a UE is a single-sector UE or a multi-sector UE. In one embodiment, a channel quality indicator that identifies the quality of a channel for a particular UE is determined for each sector. A strongest channel quality that identifies the sector in which the UE has the strongest channel quality is then determined. Differences are then determined that identify the difference between the strongest channel quality and the channel quality of a channel in each sector. Based on the differences, the sectors with which the UE has an association are determined.

In another embodiment, an iteration schedule that identifies a scheduling instruction for each scheduler of the plurality of schedulers for each iteration of a plurality of iterations is determined. For each iteration of the plurality of iterations, each scheduler performs the scheduling instruction associated with the respective scheduler in accordance with the iteration schedule. Scheduling instructions may, for example, identify a particular UE to be scheduled, or may indicate that the scheduler is to take no action for the respective iteration.

The scheduling instructions may be provided to the schedulers by a sector synchronizer. For each iteration, the sector synchronizer provides a scheduling instruction to each scheduler based on the iteration schedule.

A multi-sector UE may have a primary association with a primary sector and a secondary association with a secondary sector. A first scheduling instruction may be generated for a first scheduler that corresponds to the primary sector to schedule the multi-sector UE in a particular iteration. A second scheduling instruction may be generated for a second scheduler that corresponds to the secondary sector to take no action during the particular iteration. The first scheduler may then schedule the multi-sector UE in a particular scheduling unit of the scheduling group that is associated with the primary sector, and may mark the corresponding scheduling unit in the scheduling group that is associated with the secondary sector as being unavailable for allocation. This ensures that no UE associated with the secondary sector will be scheduled in the corresponding scheduling unit, and thereby facilitates spatial domain multiplexing for the multi-sector UE.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 6 is a diagram of an exemplary structure illustrating the results of the method for identifying each UE as either a multi-sector UE or a single-sector UE, as discussed with reference to FIG. 5;

FIG. 7 is a diagram illustrating exemplary sector associations of UEs;

FIG. 8 is a diagram illustrating an exemplary prioritization of UEs, including data utilized to determine the exemplary prioritization according to one embodiment;

FIG. 9 is a diagram illustrating UEs in priority order based on the resource allocation weight $W^R{}_{UE}$ illustrated in FIG. 8;

FIG. 14 is a diagram of an exemplary iteration schedule, according to one embodiment;

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
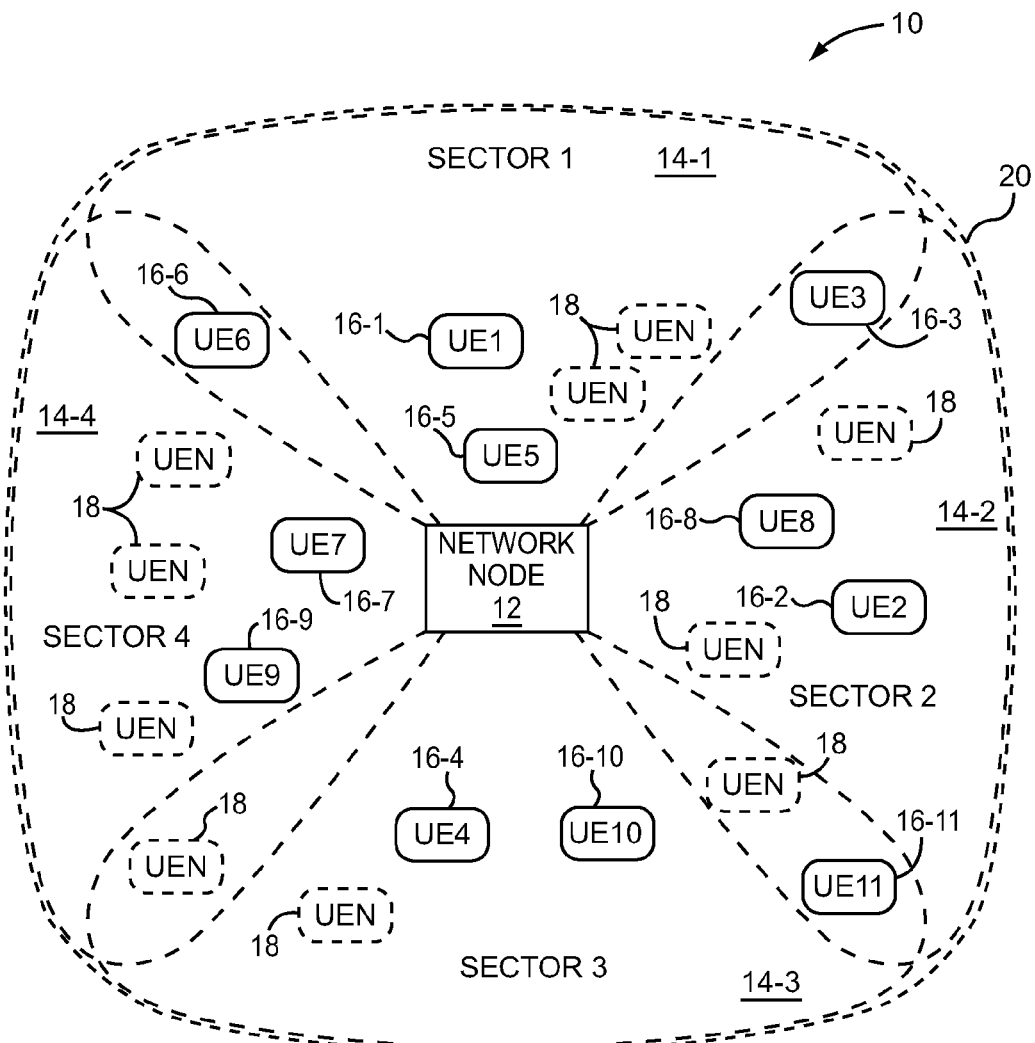
FIG. 1 is a diagram of a cellular communications system in which embodiments of the present disclosure may be practiced.

The present disclosure relates to the parallel scheduling of user equipment devices (UEs) for uplink transmissions. FIG. 1 is a block diagram illustrating a cellular communications system 10 in which embodiments of the present disclosure may be practiced. For purposes of illustration, the embodiments will be discussed in the context of a 3rd Generation Partnership Project (3GPP) Long Term Evolution (LTE) cellular communications system 10, but the embodiments are not limited to any particular type of cellular communications system 10. The cellular communications system 10 includes one or more network nodes 12 that comprise, for example, a cellular base station, such as a 3GPP eNodeB base station or the like. While for purposes of illustration only a single network node 12 is depicted, it will be appreciated that the cellular communications system 10 may have many network nodes 12 to provide wireless service over a large geographic region. The network node 12 provides wireless service to one or more UEs 16-1-16-N (generally, UEs 16), and UEs 18, within a wireless coverage area 20 of the network node 12. A UE 16, 18 may comprise, for example, a cellular telephone such as an Apple® iPhone® smartphone, an Android™-based smartphone, or the like; a computing tablet with cellular capabilities such as an Apple® iPad® or the like; a laptop computer with cellular capabilities; or any other processing device capable of communicating wirelessly with a cellular network node.

The wireless coverage area 20 comprises a plurality of wireless sub-coverage areas, referred to herein as sectors 14-1-14-4 (generally, sectors 14), each of which is associated with a separate antenna (not illustrated) coupled to the network node 12. An exemplary wireless coverage area of each sector 14 is illustrated in dashed outline in FIG. 1. As shown, the wireless coverage areas of multiple sectors 14 may overlap in certain areas. While only four sectors 14 are illustrated, the present disclosure is not limited to any particular number of sectors. The use of multiple antennae to implement corresponding sectors 14 facilitates spatial domain multiplexing (SDM) for those UEs 16, 18, such as the UEs 16-3 and 16-6, for example, that are in an area of overlapping coverage that allows multiple antennas to receive a UE's uplink transmissions.

The network node 12 provides data to the UEs 16, 18 during downlink transmissions, and receives data from the UEs 16, 18 during uplink transmissions. Uplink transmissions are scheduled to ensure that transmissions from multiple UEs 16, 18 do not interfere with one another. Typically a UE 16, 18 is scheduled for an uplink transmission in a resource unit that may be defined in terms of, for example, a particular time (e.g., time slot), a particular frequency or frequencies, and/or a particular duration (e.g., a number of time slots). Longer transmissions may require more time slots than shorter transmissions. The present disclosure is not limited to any particular type of allocated resource unit for an uplink transmission, and the term "scheduling unit" will be used herein to refer generally to a resource unit that is allocated, or could be allocated, to a UE 16, 18 for an uplink transmission.

Because each sector 14 is associated with a different antenna, each sector 14 may have an associated scheduling unit group available for allocation for uplink transmissions during an uplink transmission period of time. The scheduling units in each scheduling unit group may correspond to scheduling units in other scheduling unit groups in that, for example, they may comprise identical attributes in terms of time and frequency. For example, each scheduling unit in a scheduling unit group may be defined in terms of a particular time slot and frequency, and the scheduling units in each scheduling unit group may have the same or similar time slots and frequencies as those scheduling units in other scheduling unit groups. For example, if the UE 16-1 was allocated a particular scheduling unit associated with a particular time slot and frequency in the scheduling unit group that is associated with the sector 14-1 for an uplink transmission, and the UE 16-4 was allocated the corresponding particular scheduling unit associated with the same time slot and frequency in the scheduling unit group that is associated with the sector 14-3 for an uplink transmission, the concurrent transmissions at identical times and frequencies would likely not substantially interfere with one another due to the spatial separation of such UEs 16. Accordingly, one advantage of the use of the multiple sectors 14 is the ability to schedule multiple UEs 16, 18 at the same time and the same frequency to increase traffic density of the wireless coverage area 20. As long as the respective multiple UEs 16, 18 are sufficiently spatially separated from one another, and from adjacent sectors 14, such transmissions should not substantially interfere with one another.

The multiple sectors 14 may also be used to facilitate SDM. SDM relates to the reception of multiple copies of a transmitted signal via different paths to generate a combined signal that may be stronger than any single received copy of the transmitted signal. In particular, SDM may be possible for those UEs 16, 18 whose uplink transmissions are received in sufficient strength by different antennas located in different sectors. Such UEs 16, 18 may be referred to herein as "multi-sector" UEs 16, 18. UEs 16, 18 whose transmissions are primarily received in only a single sector 14 may be referred to herein as "single-sector" UEs 16, 18. For example, the UE 16-11 is located in overlapping areas of the sectors 14-2 and 14-3 and thus may be referred to as a multi-sector UE 16-11. An uplink transmission of the UE 16-11 may therefore be received by both a first antenna that is associated with the sector 14-2 and a second antenna that is associated with the sector 14-3. The separate received signals may be diversity combined to form a stronger signal than is individually received by either the first or second antennas. However, so that each of the first and second antennas may receive the uplink transmission of the UE 16-11, the UE 16-11 will preferably be allocated a particular scheduling unit in either the scheduling unit group that is associated with the sector 14-2 or the scheduling unit group that is associated with the sector 14-3, and the corresponding scheduling unit in the other sector 14 will be reserved, so that no other UE 16, 18 is allocated such corresponding scheduling unit for an uplink transmission. Thus, the scheduling of a multi-sector UE 16, 18 may involve the allocation of corresponding scheduling units associated with different sectors.

A UE 16, 18 at any particular point in time may have data to transmit to the network node 12 in an uplink transmission, or may not have data to transmit to the network node 12 in an uplink transmission. Thus, at any particular point in time, a plurality of the UEs 16, 18 may need to be scheduled for an uplink transmission, and others of the UEs 16, 18 may not. For purposes of illustration, assume that each of the UEs 16 illustrated in solid outline has an uplink transmission for the network node 12, and the UEs 18 illustrated in dashed outline, while also in the wireless coverage area 20, have no uplink transmission for the network node 12 at such particular point in time.

A network node conventionally schedules the UEs which require an uplink transmission sequentially. For each such UE, a number of determinations are typically made, including identifying the most appropriate part of the frequency spectrum to use for the transmission, which modulation and coding scheme to use for the transmission, and which allocation units will be allocated for the transmission. These determinations utilize clock cycles of the network node's processing subsystem, and in those situations where there are a number of UEs waiting to be scheduled for an uplink transmission, latency can become a limiting factor in maximizing the traffic capacity in the wireless coverage area of the network node. Thus, the network node may be unable to schedule all the UEs that need to be scheduled in the period of time that the network node has to determine the schedule, and thus some UEs may have to wait for a subsequent uplink transmission period of time.

Figure 2:
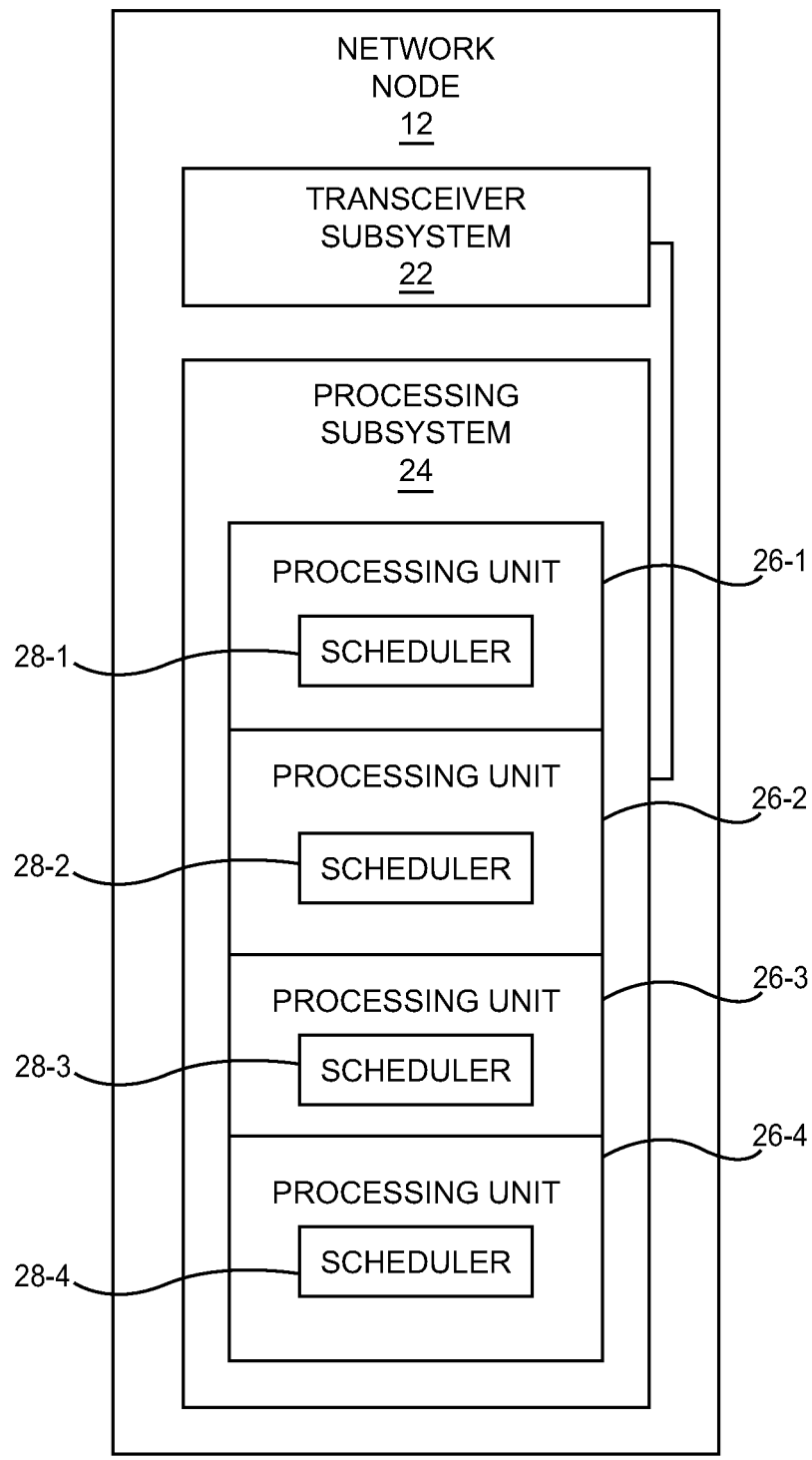
FIG. 2 is a block diagram of an exemplary network node according to one embodiment of the present disclosure.

FIG. 2 is a block diagram of an exemplary network node 12 according to one embodiment of the present disclosure. The network node 12 includes a transceiver subsystem 22 and a processing subsystem 24. The transceiver subsystem 22 generally includes analog and, in some embodiments, digital components for sending and receiving communications to and from UEs, such as the UE 16, 18 within the wireless coverage area 20 of the network node 12, as well as sending and receiving communications to and from other network nodes 12. From a communications protocol view, the transceiver subsystem 22 may implement at least part of Layer 1 (i.e., the Physical or "PHY" Layer). The processing subsystem 24 generally implements other remaining portions of Layer 1, as well as functions for higher layers in the wireless communications protocol (e.g., Layer 2 (data link layer), Layer 3 (network layer), etc.). Of course, the detailed operation for each of the functional protocol layers, and thus the transceiver subsystem 22 and the processing subsystem 24, will vary depending on both the particular implementation as well as the standard or standards supported by the network node 12.

Those skilled in the art will appreciate that the block diagram of the network node 12 illustrated in FIG. 2 necessarily omits numerous features that are not necessary to a complete understanding of this disclosure. Although all of the details of the processing subsystem 24 are not illustrated, the processing subsystem 24 comprises several processing units 26-1-26-4 (generally, processing units 26), which facilitate concurrent and parallel processing of multiple tasks in the network node 12. The processing units 26 may comprise, for example, individual cores of a multi-core processor, or may comprise separate processors that are implemented on separate integrated circuits and in conjunction with an operating system that facilitates parallel and distributed processing of the multiple separate processors. While for purposes of illustration four processing units 26 are depicted, the embodiments are not limited to any particular number of processing units 26.

Each processing unit 26-1-26-4 may process a corresponding scheduler 28-1-28-4 (generally, schedulers 28), which, as discussed in greater detail herein, may be responsible for scheduling UEs 16 that are associated with a corresponding sector 14 and waiting to send an uplink transmission. For example, the scheduler 28-1 may correspond to the sector 14-1, the scheduler 28-2 to the sector 14-2, the scheduler 28-3 to the sector 14-3, and the scheduler 28-4 to the sector 14-4. In one embodiment, the schedulers 28 may be implemented with complex programming instructions that are stored on a computer program product, such as a computer storage medium (not illustrated), and executed by the corresponding processing unit 26 to implement the functionality described herein. In addition, the processing subsystem 24 may comprise various digital hardware blocks (e.g., one or more Application Specific Integrated Circuits (ASICs), one or more off-the-shelf digital or analog hardware components, or a combination thereof) configured to carry out some or all of the functionality of the network node 12 described herein.

Figure 3:
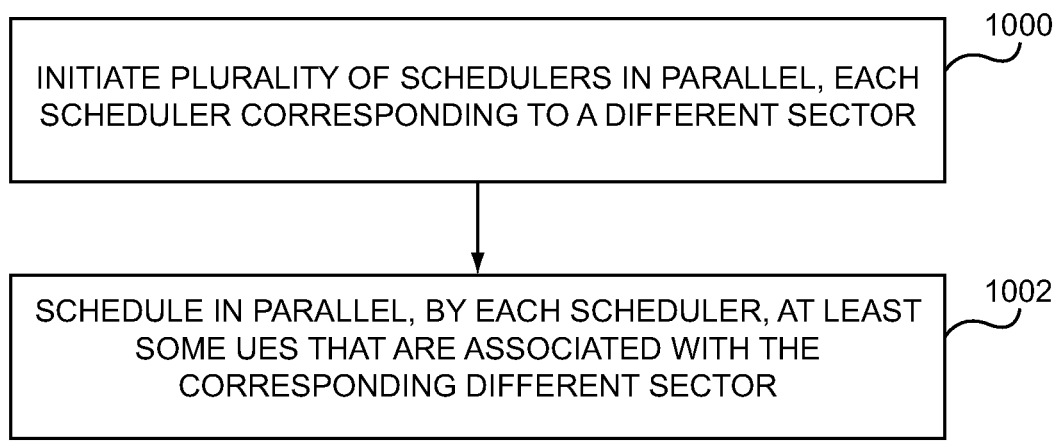
FIG. 3 is flowchart illustrating an exemplary method for parallel scheduling in the cellular communications system illustrated in FIG. 1, according to one embodiment.

FIG. 3 is flowchart illustrating an exemplary method for parallel scheduling in the cellular communications system 10 according to one embodiment, and will be discussed in conjunction with FIGS. 1 and 2. Generally, the network node 12 initiates the plurality of schedulers 28 to execute in parallel, each scheduler 28 corresponding to a different sector 14 (block 1000). Each scheduler 28 then schedules in parallel at least some of the UEs 16 that are associated with the corresponding different sector 14 (block 1002). Scheduling in parallel refers to each scheduler 28 processing at least in part concurrently with the other schedulers 28, such that at least some processing of each respective scheduler 28 overlaps in time with the processing of another scheduler 28. Such parallel processing may reduce or completely eliminate the latency associated with the sequential scheduling of UEs within the wireless coverage area 20, and thereby increase traffic density of the wireless coverage area 20.

Figure 4:
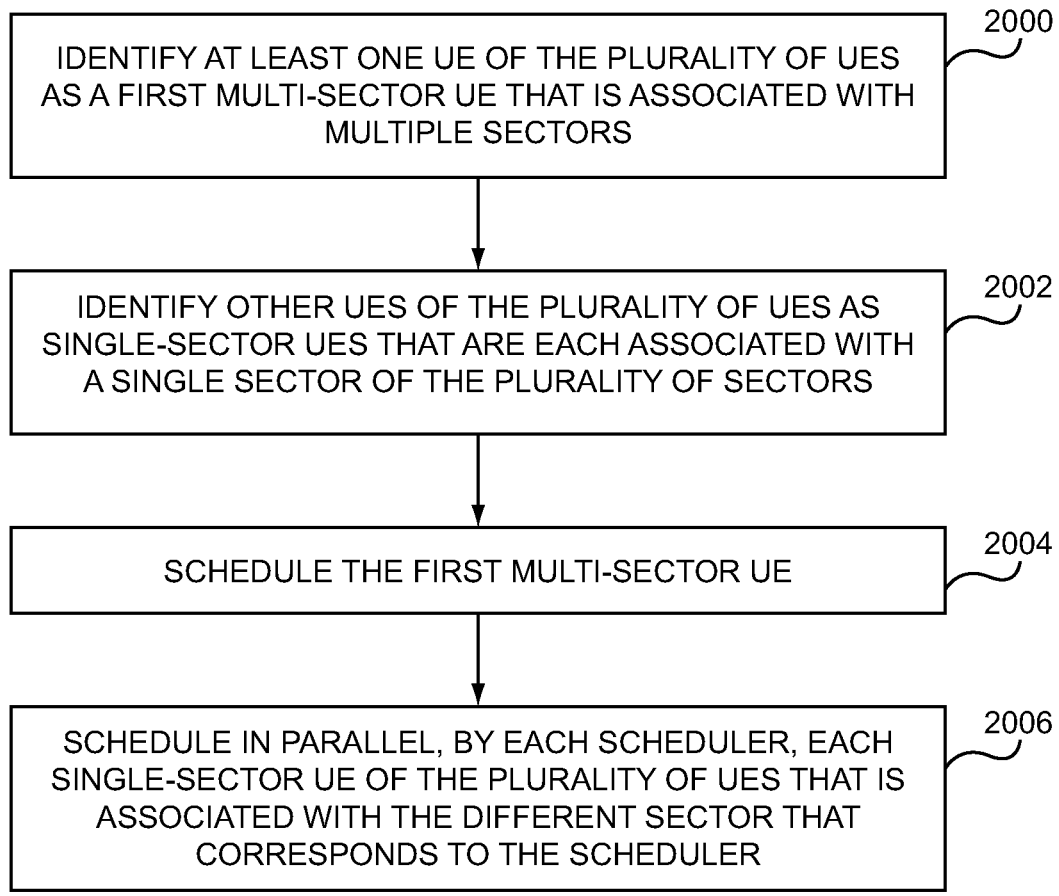
FIG. 4 is a flowchart of an exemplary method for parallel scheduling according to one embodiment in greater detail.

FIG. 4 is a flowchart illustrating an exemplary method for parallel scheduling in the cellular communications system 10 according to one embodiment in greater detail, and will be discussed in conjunction with FIG. 1. Initially, at least one UE 16 of the plurality of UEs 16 is identified as a first multi-sector UE 16 (FIG. 4, block 2000). As discussed above, a multi-sector UE 16 is a UE 16 whose uplink transmissions are received in sufficient strength by different antennas located in different sectors 14. Mechanisms for identifying a UE 16 as a multi-sector UE 16 will be discussed in greater detail herein with reference to FIG. 5, but for purposes of illustration, assume that the UEs 16-3, 16-6, and 16-11, each of which is depicted as being located in an overlapping coverage area of multiple sectors 14, are identified as multi-sector UEs 16. Other UEs 16 of the plurality of UEs 16 are identified as single-sector UEs 16 that are each associated with a single sector 14 of the plurality of sectors 14 (FIG. 4, block 2002). Again, mechanisms for identifying a UE 16 as a single-sector UE 16 will be discussed in greater detail herein, but for purposes of illustration, assume that the UEs 16-1, 16-2, 16-4, 16-5, 16-7-16-10, each of which is depicted as being located in a non-overlapping coverage area of a single sector 14, are identified as single-sector UEs 16.

A first multi-sector UE 16 is scheduled for an uplink transmission (FIG. 4, block 2004). In this example, where the three UEs 16-3, 16-6, and 16-11 are each identified as a multi-sector UE 16, each of such multi-sector UEs 16 may be scheduled for an uplink transmission. Each scheduler 28 then schedules in parallel each single-sector UE 16 that is associated with the sector 14 that corresponds to the scheduler 28 (FIG. 4, block 2006).

Figure 5:
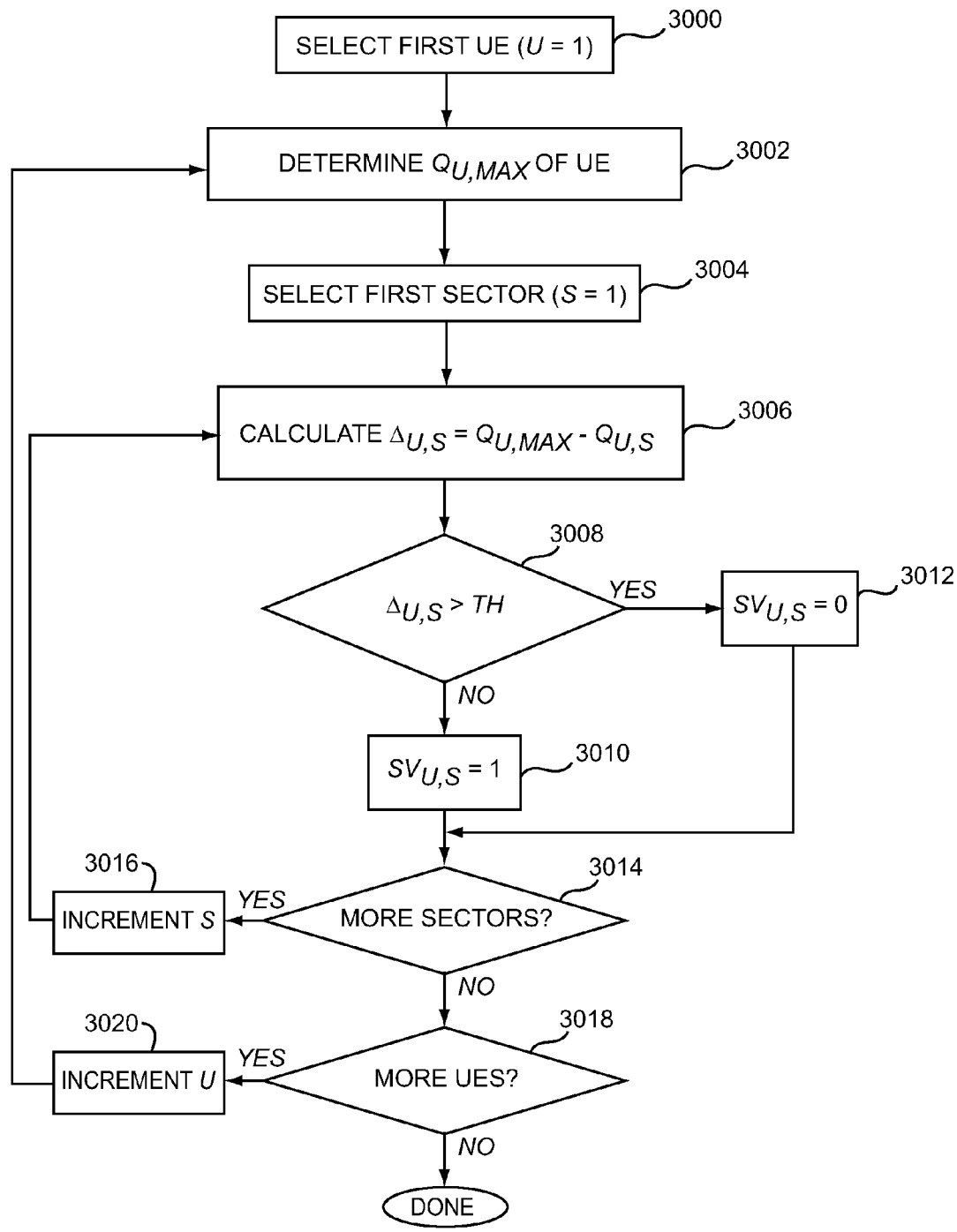
FIG. 5 is flowchart of an exemplary method for identifying each user equipment device (UE) of a plurality of UEs as either a multi-sector UE or a single-sector UE, according to one embodiment.

FIG. 5 is flowchart of an exemplary method for identifying each UE 16 of the plurality of UEs 16 as either a multi-sector UE 16 or a single-sector UE 16, according to one embodiment. Assume that the UE 16-1 is initially selected for processing (block 3000). A plurality of channel quality indicators (Q) for the UE 16-1, each of which identifies the quality of a respective channel of the UE 16-1 in a particular sector 14, are compared to each other to determine in which sector 14 the UE 16-1 has the strongest channel (block 3002). The result of this determination is referred to in FIG. 5 as the variable $Q_{U,MAX}$, wherein Q is the channel quality indicator; U is an index that identifies the particular UE 16, in this example, the UE 16-1; and MAX identifies the particular sector 14 in which the UE 16-1 has the maximum channel quality indicator. In one embodiment, the channel quality indicator may comprise a filtered channel quality indicator that indicates the filtered channel quality of the channel, although the embodiments are not limited to filtered channel quality indicators, and any metric that identifies the quality of a channel may be utilized. Filtered channel quality indicators may be determined by the network node 12 by measuring the received uplink channel quality with the UE 16-1 in the respective sector 14. In another embodiment, the channel quality indicator comprises a channel quality indicator (CQI) which may be reported to the network node 12 by the UE 16-1 for each sector 14.

A difference channel quality indicator, $\Delta_{U,S}$ is then determined for a first sector 14 of the plurality of sectors 14, in accordance with the following equation:

$$\Delta_{U,S} = Q_{U,MAX} - Q_{U,S},$$

wherein $Q_{U,S}$ is the channel quality indicator for the channel quality of the particular UE 16 (in this first iteration that of UE 16-1) in the sector 14 identified by the index S (blocks 3004, 3006).

The difference channel quality indicator $\Delta_{U,S}$ therefore contains the difference between the channel quality indicator of the channel quality of the sector 14 in which the UE 16-1 has the strongest channel quality ($Q_{U,MAX}$) and that of the channel quality indicator of a particular sector 14. The difference channel quality indicator $\Delta_{U,S}$ is then compared to a particular threshold criterion. If the difference channel quality indicator $\Delta_{U,S}$ is less than the threshold criterion, then a field in a scheduling structure SV may be set to 1 to indicate that the UE 16-1 has a sufficiently strong channel to be associated with the particular sector 14 that is identified by the index S (blocks 3008-3010). If the difference channel quality indicator $\Delta_{U,S}$ is greater than the threshold criterion, then the field in the scheduling structure SV may be set to 0 to indicate that the UE 16-1 has no association with the particular sector 14 that is identified by the index S (blocks 3008, 3012). This process is repeated for each remaining sector 14, so that the structure SV contains either a 1 or a 0 for each respective sector 14 with which the UE 16-1 could be associated (blocks 3014, 3016, 3006-3012). After the UE 16-1 is processed, the next UE 16, such as the UE 16-2, is processed in a similar manner until each UE 16 has been processed (blocks 3018, 3020, 3002-3018). The process is complete after each UE 16 has been processed.

FIG. 6 is a diagram of an exemplary structure SV 30 illustrating the results of the method for identifying the UEs 16 as either multi-sector UEs or single-sector UEs, as discussed with reference to FIG. 5. The structure SV 30 may be referred to as a scheduling vector, and contains a plurality of rows 32-1-32-11 (generally, rows 32), each of which corresponds to a particular UE 16-1-16-11, as indicated by a column 34. Each row 32 comprises a field that corresponds to a particular sector 14, as indicated by a heading row 36. Some of the fields in the structure SV 30 contain a value of 1, indicating that a particular UE 16 has an association with a particular sector 14, and others have a value of 0, indicating that a particular UE 16 has no association with a particular sector 14. For example, the row 32-1 indicates that the UE 16-1 has an association with the sector 14-1 (i.e., sector 1 in FIG. 1), and no association with any other sector 14. With reference once again to FIG. 5, these values were the result of determining that the calculated difference channel quality indicator based on the channel quality of the UE 16-1 in sector 14-1 met the channel quality criterion, but that the calculated difference channel quality indicators based on the channel qualities of the UE 16-1 in sectors 14-2-14-4 did not meet the channel quality criterion. Row 32-1 thus indicates that the UE 16-1 has an association with the sector 14-1, and that the UE 16-1 is a single-sector UE 16.

The row 32-3 indicates that the UE 16-3 has an association with the sector 14-1 and the sector 14-2 (i.e., sector 2 in FIG. 1). Thus the UE 16-3 is a multi-sector UE 16. Similarly, the row 32-6 indicates that the UE 16-6 has an association with the sector 14-1 and the sector 14-4 (i.e., sector 4 in FIG. 1), and is thus also a multi-sector UE 16. The row 32-11 indicates that the UE 16-11 has an association with the sector 14-2 and the sector 14-3 (i.e., sector 3 in FIG. 1), and is therefore also a multi-sector UE 16. Rows 32-2, 32-4, 32-5, and 32-7-32-10 indicate that UEs 16-2, 16-4, 16-5, and 16-7-16-10 are single-sector UEs 16.

A multi-sector UE 16 will typically have a primary association with a particular sector 14, and a secondary association with any other sectors 14 with which the UE 16 has an association, based on the strength of the channel quality in the respective sector 14. The sector 14 in which the channel quality indicator is the strongest may be identified as the sector 14 with which the UE 16 has the primary association, and thus the UE 16 has a secondary association with the other sector 14, or sectors 14, with which the UE 16 has an association. This information may be determined as each UE 16 is identified as a multi-sector UE 16 or a single-sector UE 16 in accordance with the method discussed with reference to FIG. 5, for example.

FIG. 7 is a diagram illustrating exemplary sector associations of the UEs 16. Note that the UE 16-3 has a primary association with the sector 14-1 and a secondary association with the sector 14-2. Similarly, the UE 16-6 has a primary association with the sector 14-1 and a secondary association with the sector 14-4. The UE 16-11 has a primary association with the sector 14-2 and a secondary association with the sector 14-3. Each of the single-sector UEs 16 may be said to have a primary association with the sole sector 14 with which it is associated. For single-sector UEs 16, the primary association may be inferred from the information contained in the structure SV 30, discussed above with reference to FIG. 6. For the multi-sector UEs 16, the primary and secondary associations may also be maintained in the structure SV 30, or may be maintained separately.

In one embodiment, the UEs 16 may optionally be prioritized prior to scheduling. Any desired criterion or criteria may be used to prioritize such UEs 16, such as, for example, criteria relating to Quality of Service (QoS). In one embodiment, prioritization may be based on the following function:

$$W_{UE} = W^{QoS}_{UE} + \alpha \cdot W^{R}_{UE}, \text{ wherein:}$$

$W^{R}_{UE}$ is a resource allocation weight of a particular UE 16, identified by an index UE. The resource allocation weight may be a function of a summation of the row 32 of the structure SV 30 that corresponds to the particular UE 16 identified by the index UE, such that $$W^{R}_{UE} = f\left(\sum_{I} SV_{UE,I}\right),$$

wherein I is the index identifying a field in the corresponding row 32 of the UE 16. The function may be a linear mapping based on $\Sigma SV_{UE,I}$ and thus $W^{R}_{UE}$ is higher if the value of $\Sigma SV_{UE,I}$ is larger. $W^{QoS}_{UE}$ is a QoS dependent weight for each UE 16, which may be used, for example, to request time domain resources, such as control signaling. The QoS dependent weight may be based on a QoS profile of each priority queue. A QoS profile is a set of QoS Class Indicator (QCI) dependent QoS requirements, such as priority, delay, scheduling strategy, and resource strategy, or the like. An operator may configure the QoS profiles for each priority queue. For each QoS profile, a weight function may be defined and the QoS weight can be calculated. One example of such a weight function is a Round Robin scheduling strategy where the QoS weight linearly depends on the time since the UE 16 was last scheduled. The longer the time since the UE 16 was last scheduled, the higher the QoS weight. The factor α is used to control how important the resource allocation weight $W^{R}_{UE}$ is with respect to the QoS based weight $W^{QoS}_{UE}$. Increasing the value of α will place a higher importance on the resource allocation weight $W^{R}_{UE}$.

FIG. 8 is a diagram illustrating an exemplary prioritization of the UEs 16, including data utilized to determine the exemplary prioritization according to one embodiment. In this example, α is equal to 10. For purposes of illustration, the contents of the structure SV 30 are shown in columns 38. Column 40 identifies an exemplary resource allocation weight $W^{R}_{UE}$ for each UE 16, wherein $W^{R}_{UE}$ is based on a simple summation of the contents of the row 32 of the structure SV 30 that corresponds to the respective UE 16, as identified in the columns 38. Column 42 contains exemplary QoS dependent weights $W^{QoS}_{UE}$ for each UE 16. Column 44 contains $W_{UE}$ values based on the factor α having a value of 10.

FIG. 9 is a diagram illustrating the UEs 16 in priority order based on the resource allocation weight $W_{UE}$ values illustrated in FIG. 8. FIG. 9 also contains a column 46 that identifies the sectors 14 with which the respective UEs 16 are associated, based on the sector association information discussed with reference to FIG. 7.

Figure 10:
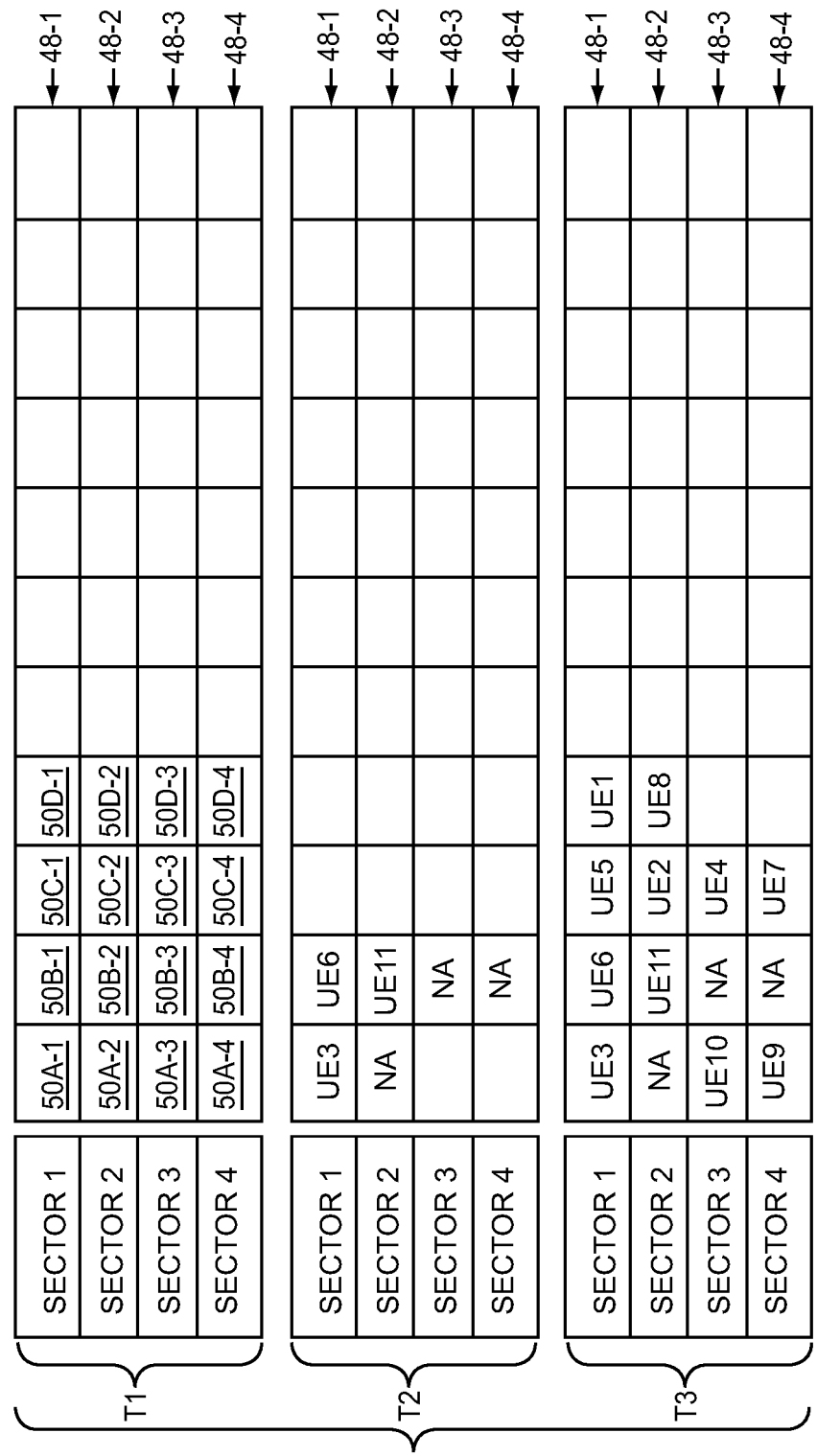
FIG. 10 illustrates scheduling unit groups that are associated with a plurality of sectors at three different points in time, according to one embodiment.

FIG. 10 illustrates scheduling unit groups 48-1-48-4 (generally, scheduling units 48) that correspond to the sectors 14-1-14-4 at three different points in time, and will be used to describe an exemplary parallel scheduling of UEs 16 in accordance with one embodiment of the method for parallel scheduling of UEs 16 illustrated in FIG. 4, wherein multi-sector UEs 16 are initially sequentially scheduled, and single-sector UEs 16 are subsequently scheduled in parallel. FIG. 10 will be discussed in conjunction with FIG. 9. Assume that the scheduling unit group 48-1 is associated with the sector 14-1, the scheduling unit group 48-2 is associated with the sector 14-2, the scheduling unit group 48-3 is associated with the sector 14-3, and the scheduling unit group 48-4 is associated with the sector 14-4. Each scheduling unit group 48 contains a plurality of scheduling units 50. The scheduling units 50 associated with a particular sector 14 are identified by the same numeral as such sector 14. Thus, for example, scheduling units 50A-1, 50B-1, 50C-1, and 50D-1 are in the scheduling unit group 48-1 that is associated with the sector 14-1.

The scheduling units 50 in one of the scheduling unit groups 48 may correspond to other scheduling units 50 in the same column illustrated in FIG. 10. For example, the scheduling units 50A-1, 50A-2, 50A-3, and 50A-4 may have a correspondence with one another. The correspondence may be based on time and/or frequency, for example. In particular, each of the scheduling units 50A-1, 50A-2, 50A-3, and 50A-4 may be a same time and a same frequency.

Assume that a time T1 is immediately prior to the time that the UEs 16 are scheduled for an uplink transmission to the network node 12, and thus the scheduling units 50 are all empty, or null. In accordance with the method of parallel scheduling discussed with reference to FIG. 4, assume next that the UEs 16-3, 16-6, and 16-11 are identified as multi-sector UEs 16, and that the diagram illustrated in FIG. 9 reflects the determined association of each UE 16 with a sector 14 as well as the prioritization of such UEs 16 immediately prior to the scheduling of the UEs 16, as determined in accordance with FIGS. 5-8. In this embodiment, the network node 12 begins to sequentially schedule the multi-sector UEs 16 prior to parallel scheduling the single-sector UEs 16. Because the UE 16-3 has the highest prioritization and has a primary association with the sector 14-1, the network node 12 initially schedules the UE 16-3 in the first scheduling unit 50A-1 of the scheduling unit group 48-1 that is associated with the sector 14-1.

For each UE 16 that is scheduled, the scheduler may perform a number of steps. For example, the scheduler may calculate the available resources for the UE 16. The scheduler may allocate one or more resource allocation units for the UE 16 based on a particular resource allocation strategy. The resource allocation strategy, for example, may be defined by an operator, and may include, for example, frequency selective scheduling (maximize resource utilization), resource fair, and the like. Thus, if the maximize resource utilization resource allocation strategy is used, the spectrum is allocated in such a way as to minimize the total number of fragments of scheduling units 50. The scheduler may also perform link adaptation for the UE 16.

Because the UE 16-3 has a secondary association with the sector 14-2, the network node 12 marks the scheduling unit 50A-2, which corresponds to the scheduling unit 50A-1, as Not Available (NA) for scheduling, so that no other UE 16 is scheduled to transmit in the scheduling unit 50A-2. This facilitates signal reception of the uplink transmission of the UE 16-3 in both sectors 14-1 and 14-2, allowing for SDM of such uplink transmission.

Because the UE 16-11 has the next highest priority, the network node next sequentially schedules the UE 16-11 for uplink transmission in the scheduling unit 50B-2 in the scheduling unit group 48-2 that is associated with the sector 14-2. Note that due to the previous scheduling of the UE 16-3, the scheduling unit 50A-2 in the scheduling unit group 48-2 was not available for scheduling the UE 16-11. Because the UE 16-11 has a secondary association with the sector 14-3, the network node 12 marks the corresponding scheduling unit 50B-3 in the scheduling unit group 48-3 that is associated with the sector 14-3 as NA. The network node 12 then schedules the multi-sector UE 16-6 for an uplink transmission in the scheduling unit 50B-1. Because the UE 16-6 has a secondary association with the sector 14-4, the network node 12 marks the corresponding scheduling unit 50B-4 as NA so that no other UE 16 is scheduled to transmit an uplink transmission in such scheduling unit. After the network node 12 has scheduled each multi-sector UE 16, the scheduling unit groups 48 may appear as illustrated at time 2.

After the network node 12 has scheduled the multi-sector UEs 16, the schedulers 28 (FIG. 2) may then begin scheduling in parallel the UEs 16 associated with the sectors 14 that correspond to the respective schedulers 28. For example, the scheduler 28-1, which corresponds to the sector 14-1, may then schedule the UE 16-5 in the first available scheduling unit 50C-1, and the lower priority UE 16-1 in the next available scheduling unit 50D-1. Substantially concurrently therewith, and in parallel with the scheduler 28-1, the scheduler 28-2 may then schedule the higher priority UE 16-2 in the first available scheduling unit 50C-2, and the lower priority UE 16-8 in the next available scheduling unit 50D-2. The scheduler 28-3, in parallel with the other schedulers 28, may schedule the UE 16-10 in the first available scheduling unit 50A-3. The scheduler 28-3 then schedules the UE 16-4 in the next available scheduling unit 50C-3. Note that the scheduling unit 50B-3 was not available for scheduling the UE 16-4 because the scheduling unit 50B-3 was marked as NA during the scheduling of the multi-sector UE 16-11. The scheduler 28-4, in parallel with the other schedulers 28, schedules the UE 16-9 in the first available scheduling unit 50A-4, and the UE 16-7 in the next available scheduling unit 50C-4. Again, note that the scheduling unit 50B-4 was not available for scheduling a single-sector UE 16 because the scheduling unit 50B-4 was marked as NA at the time the multi-sector UE 16-6 was scheduled. After the parallel scheduling of the single-sector UEs 16 is complete, the scheduling unit groups 48 may appear as depicted at time T3.

Figure 11:
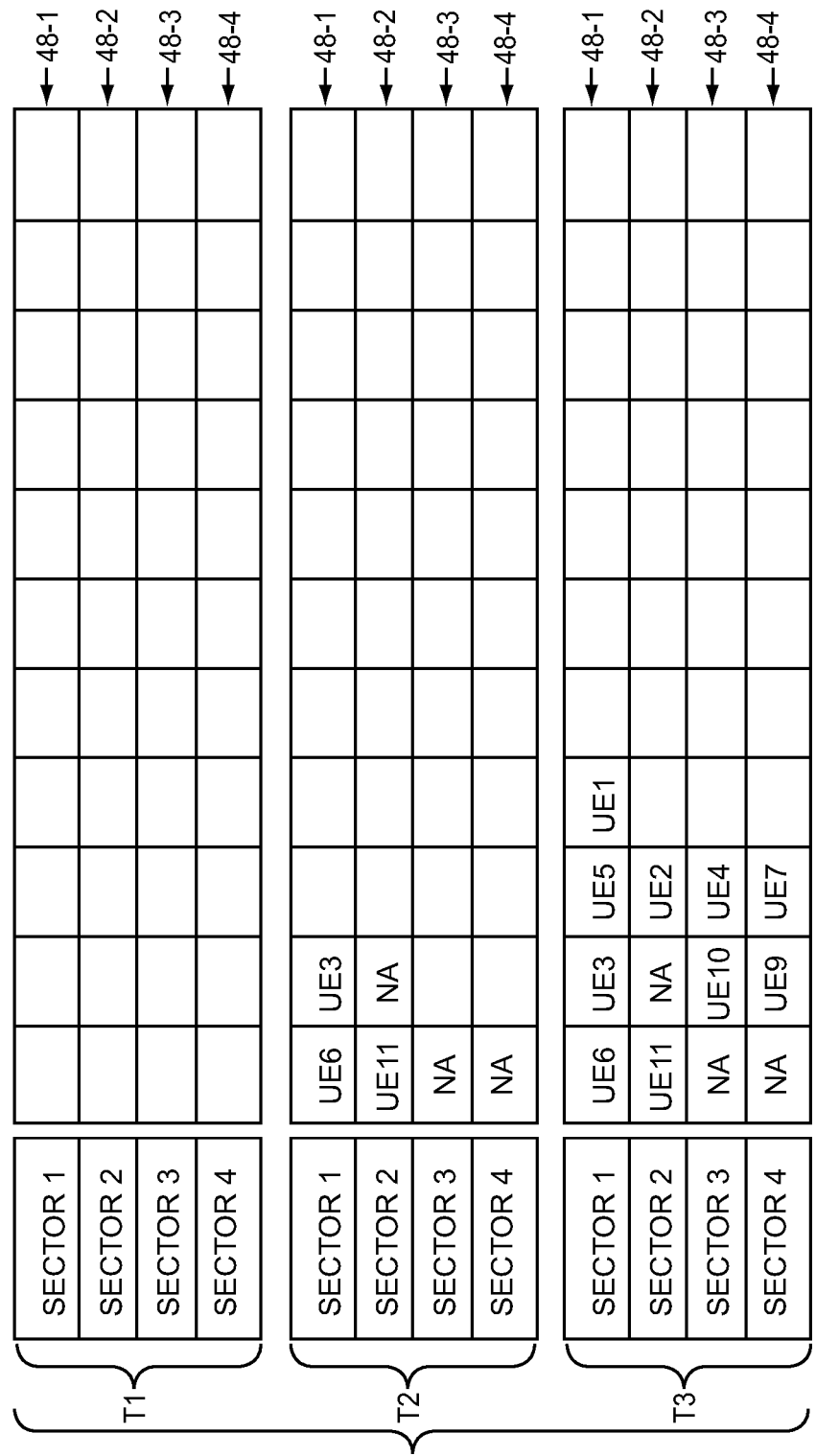
FIG. 11 illustrates scheduling unit groups that are associated with a plurality of sectors at three different points in time, according to another embodiment.

FIG. 11 illustrates the scheduling unit groups 48 that are associated with the sectors 14 at three different points in time, and will be used to describe another exemplary parallel scheduling of UEs 16 in accordance with another embodiment of the method for parallel scheduling of UEs illustrated in FIG. 4, wherein at least some multi-sector UEs 16 are initially scheduled in parallel rather than sequentially scheduled, and single-sector UEs are subsequently also scheduled in parallel. FIG. 11 will be discussed in conjunction with FIG. 9. In this embodiment, because the multi-sector UE 16-6 has a primary association with the sector 14-1 and a secondary association with the sector 14-4, and the UE 16-11 has a primary association with the sector 14-2 and a secondary association with the sector 14-3, the UEs 16-6 and 16-11 have no sector associations in common. Accordingly, the multi-sector UEs 16-6 and 16-11 may be scheduled in parallel. In this embodiment, the network node 12 schedules in parallel the multi-sector UEs 16-6 and 16-11, since scheduling of such multi-sector UEs 16 will not affect the scheduling units 50 that are being allocated to the other multi-sector UEs 16.

Because parallel scheduling is generally preferable to sequential scheduling, the network node 12 may perform such parallel scheduling of multi-sector UEs 16, even though the multi-sector UE 16-3 has a higher priority than the multi-sector UEs 16-6, 16-11. Accordingly, the scheduler 28-1 schedules the UE 16-6 in the first available scheduling unit 50A-1 and marks the scheduling unit 50A-4 as NA for allocation to any other UE 16 for uplink transmission, because the UE 16-6 has a secondary association with the sector 14-4. In parallel, the scheduler 28-2 allocates the scheduling unit 50A-2 for an uplink transmission of the UE 16-11, and marks the scheduling unit 50A-3 as NA for allocation, because the UE 16-11 has a secondary association with the sector 14-3. The scheduler 28-1 then schedules the multi-sector UE 16-3 for an uplink transmission in the next available scheduling unit 50B-1, and marks the scheduling unit 50B-2 associated with the sector 14-2 as being NA for allocation to another UE 16. After the schedulers 28 have scheduled the multi-sector UEs 16, the scheduling unit groups 48 may appear as illustrated at time T2. As discussed with respect to FIG. 10, the schedulers 28-1-28-4 may then, in parallel, schedule the remaining single-sector UEs 16. After all of the UEs 16 have been scheduled, the scheduling unit groups 48 may appear as illustrated at time T3.

Figure 12:
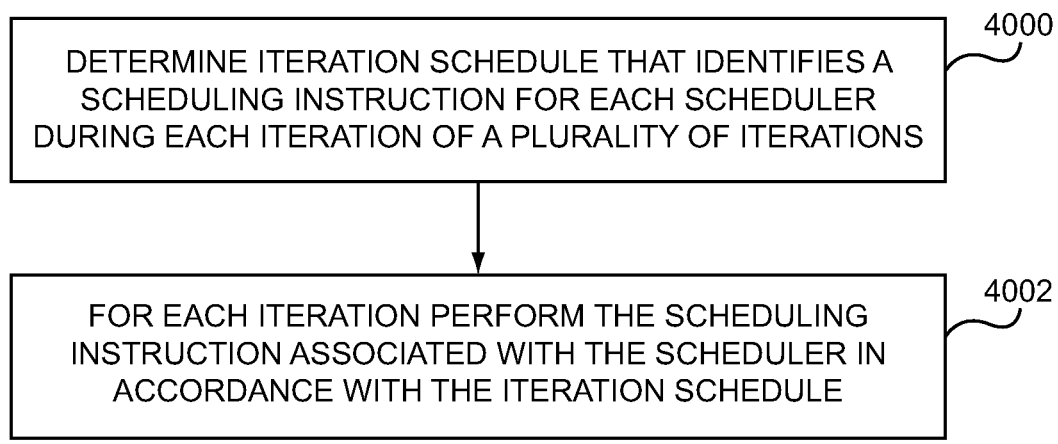
FIG. 12 is a flowchart of an exemplary method for parallel scheduling, according to another embodiment.

FIG. 12 is a flowchart of an exemplary method for parallel scheduling in the cellular communications system 10 according to another embodiment. In this embodiment, an iteration schedule is determined that identifies a scheduling instruction for each scheduler 28 during each iteration of a plurality of iterations (block 4000). Each scheduler 28 then performs the scheduling instruction identified for the respective scheduler 28 in parallel with the other schedulers 28 (block 4002).

Figure 13:
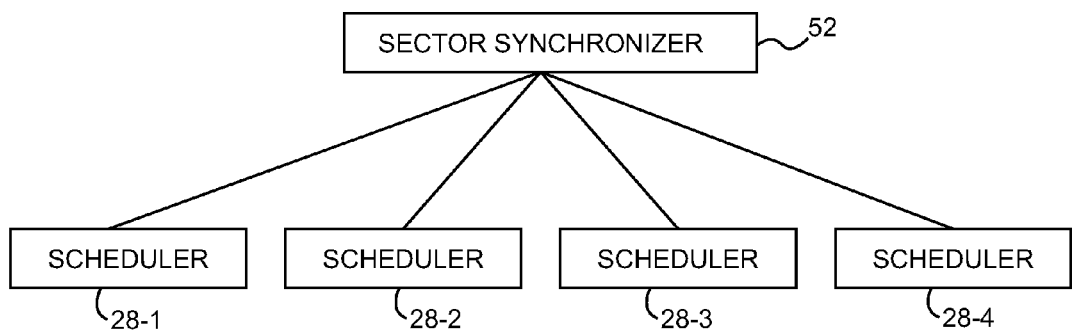
FIG. 13 is a block diagram illustrating exemplary components suitable for implementing the method illustrated in FIG. 12, according to one embodiment.

FIG. 13 is a block diagram illustrating exemplary components suitable for implementing the method illustrated in FIG. 12. A sector synchronizer 52 provides, for each iteration of a plurality of iterations, a scheduling instruction to each scheduler 28 based on the iteration scheduler. Each scheduler 28 then performs the scheduling instruction in parallel with the other schedulers 28 during the iteration. A scheduling instruction may, for example, identify a particular UE 16 that is to be scheduled by the respective scheduler 28 during the iteration. A scheduling instruction may alternatively indicate that the scheduler 28 is to take no action during the iteration.

FIG. 14 is a diagram of an exemplary iteration schedule 54, according to one embodiment. In this embodiment, each UE 16 is also identified as a multi-sector UE 16 or a single-sector UE 16. This determination may be made in any desired manner, such as that discussed above with regard to FIG. 5. Also, the UEs 16 may or may not be prioritized for the uplink transmissions. If prioritization is desired, any suitable prioritization process may be used, including the prioritization process discussed with regard to FIG. 8. Assume for purposes of illustration that each UE 16 has been identified as either a multi-sector UE 16 or a single-sector UE 16, and has been prioritized, in accordance with mechanisms similar to those discussed with regard to FIGS. 5 and 8, respectively. Accordingly, assume that FIG. 9 illustrates the status of the UEs 16 prior to the determination of the iteration schedule 54.

The network node 12, based on the information illustrated in FIG. 9, determines that although the multi-sector UE 16-3 has a higher priority than the multi-sector UEs 16-11, 16-6, it would be possible to schedule both UEs 16-11, 16-6 in the initial iteration if such UEs 16-11, 16-6 were scheduled prior to the multi-sector UE 16-3. This is because in contrast to the multi-sector UE 16-3, the UEs 16-11, 16-6 have no common associations with the same sectors 14. Accordingly, the network node 12 may generate a scheduling instruction 56A-1 (generally, scheduling instruction 56) that instructs the scheduler 28-1 to schedule the UE 16-6 for an uplink transmission in a first iteration. Because the UE 16-6 has a secondary association with the sector 14-4, the network node 12 generates a scheduling instruction 56A-4, which instructs the scheduler 28-4 to take no action during the first iteration. This permits the scheduler 28-1, while scheduling the UE 16-6 in a scheduling unit 50 of the scheduling unit group 48-1 that corresponds to the sector 14-1, to also mark the corresponding scheduling unit 50 in the scheduling unit group 48-4 that is associated with the sector 14-4 as being allocated in order to prevent the scheduler 28-4 from allocating another UE 16 in such scheduling unit 50. The network node 12 then generates a scheduling instruction 56A-2 that instructs the scheduler 28-2 to schedule the UE 16-11 during the first iteration. Because the UE 16-11 has a secondary association with the sector 14-3, the network node 12 generates a scheduling instruction 56A-3, which instructs the scheduler 28-3 to take no action during the first iteration. Again, this permits the scheduler 28-2 to allocate corresponding scheduling units 50 in both the scheduling unit group 48-2 that is associated with the sector 14-2 and the scheduling unit group 48-3 that is associated with the sector 14-3. This completes the scheduling instructions for the first iteration.

The network node 12 then generates a scheduling instruction 56B-1 that instructs the scheduler 28-1 to schedule the UE 16-3 in the second iteration. The network node 12 generates a scheduling instruction 56B-2 that instructs the sector 14-2 to take no action in the second iteration. The network node 12 generates a scheduling instruction 56B-3 to instruct the scheduler 28-3 to schedule the UE 16-10 in the second iteration and a scheduling instruction 56B-4 to instruct the scheduler 28-4 to schedule the UE 16-9 in the second iteration.

For the third iteration, the network node 12 generates a scheduling instruction 56C-1 that instructs the scheduler 28-1 to schedule the UE 16-5 in the third iteration, a scheduling instruction 56C-2 that instructs the scheduler 28-2 to schedule the UE 16-2 in the third iteration, a scheduling instruction 56C-3 that instructs the scheduler 28-3 to schedule the UE 16-4 in the third iteration, and a scheduling instruction 56C-4 that instructs the scheduler 28-4 to schedule the UE 16-7 in the third iteration. For the fourth iteration, the network node 12 generates a scheduling instruction 56D-1 that instructs the scheduler 28-1 to schedule the UE 16-1 in the fourth iteration, and a scheduling instruction 56D-2 that instructs the scheduler 28-2 to schedule the UE 16-8 in the fourth iteration. This completes the generation of the iteration schedule 54 for uplink transmissions for the UEs 16.

Figure 15:
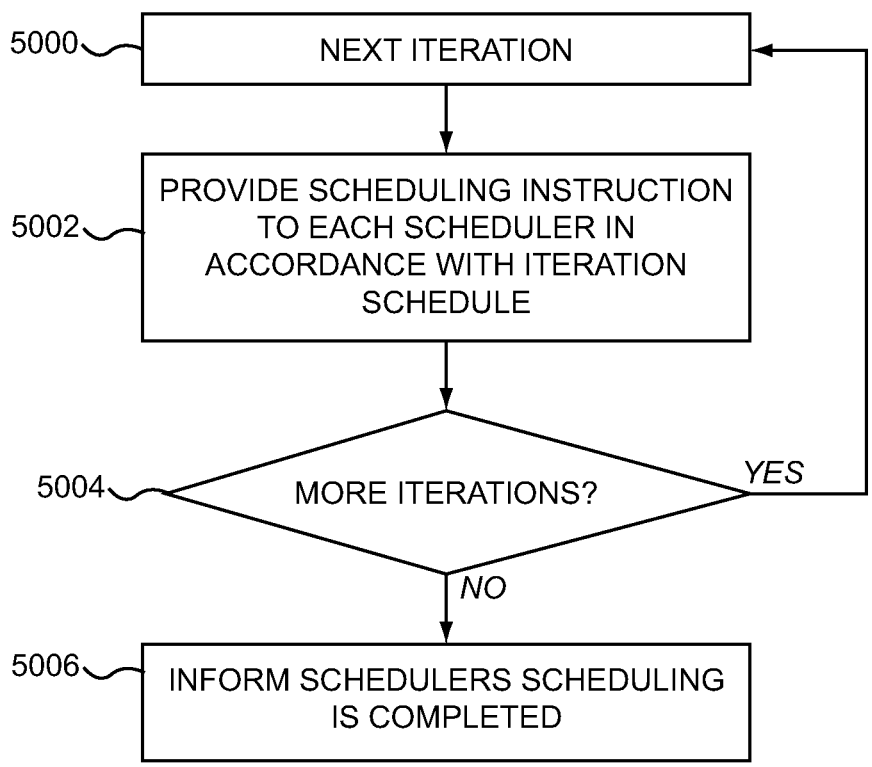
FIG. 15 is a flowchart of an exemplary method performed by a sector synchronizer, according to one embodiment.

FIG. 15 is a flowchart of an exemplary method performed by the sector synchronizer 52 (FIG. 13), according to one embodiment. In the first iteration, the sector synchronizer 52 provides the scheduling instructions 56 associated with the schedulers 28 to each scheduler 28 in accordance with the iteration schedule 54 (blocks 5000, 5002). The sector synchronizer 52 then determines whether the iteration schedule 54 includes more iterations (block 5004). If so, the sector synchronizer 52 moves to the next iteration in accordance with the iteration schedule 54, and provides the scheduling instructions to each scheduler 28 in accordance with the iteration schedule 54 (blocks 5000, 5002). If there are no more iterations, the sector synchronizer 52 informs the schedulers 28 that the scheduling of uplink transmissions for the UEs 16 is completed for this uplink transmission period of time (blocks 5004, 5006).

Figure 16:
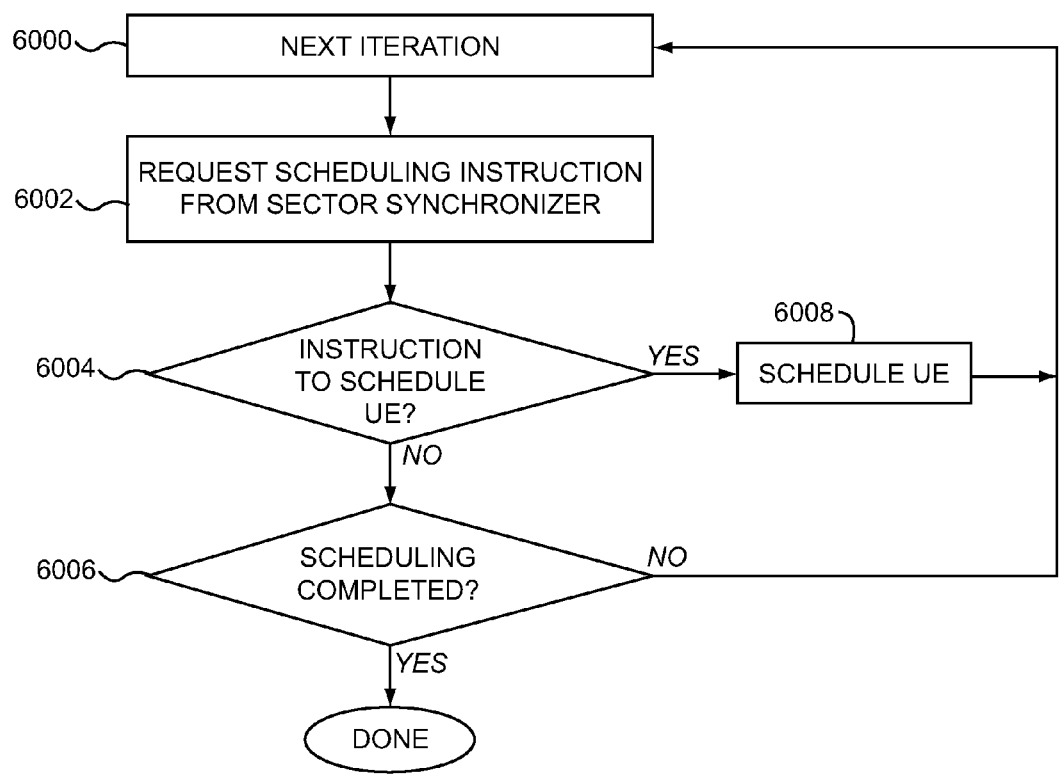
FIG. 16 is a flowchart of an exemplary method performed by each of the schedulers in coordination with the sector synchronizer, according to one embodiment.

FIG. 16 is a flowchart of an exemplary method performed by each of the schedulers 28 in coordination with the sector synchronizer 52, according to one embodiment.

FIG. 16 will be discussed from the perspective of a single scheduler 28, but it should be understood that each scheduler 28 performs the method illustrated in FIG. 16 concurrently, and in parallel. Initially, a scheduler 28 for the first iteration requests a scheduling instruction from the sector synchronizer 52 (FIG. 13) (blocks 6000, 6002). If the scheduling instruction is to schedule a UE 16, the scheduler 28 schedules the UE 16 (blocks 6004, 6008). In particular, the scheduler 28 allocates a scheduling unit 50 (FIG. 10) in a scheduling unit group 48 (FIG. 10) that corresponds to the particular scheduler 28 to the identified UE 16. Alternatively, if the scheduler 28 did not receive an instruction to schedule a UE 16, the scheduler 28 determines whether scheduling is completed (blocks 6004, 6006). In particular, for this particular iteration, the scheduler 28 might have received a scheduling instruction that indicated that no action is to be taken. If the scheduling is not completed, the process of requesting scheduling instructions continues (block 6000). If the scheduler 28 is informed that scheduling is completed, the scheduler 28 knows that there are no additional iterations for this uplink transmission period of time.

The following acronyms are used throughout this disclosure:
- 3GPP 3rd Generation Partnership Project
- ASICs Application Specific Integrated Circuits
- LTE Long Term Evolution
- NA Not Available
- QCI QoS Class Indicator
- QoS Quality of Service
- SDM Spatial Domain Multiplexing
- UE User Equipment Those skilled in the art will recognize improvements and modifications to the preferred embodiments of the present disclosure. All such improvements and modifications are considered within the scope of the concepts disclosed herein and the claims that follow.

What is claimed is:

1. A method for scheduling uplink transmissions for a plurality of user equipment devices, UEs, that are serviced by a network node having a coverage area comprising a plurality of sectors, the method comprising:
   initiating, by the network node, a plurality of schedulers in parallel, each scheduler of the plurality of schedulers corresponding to a different sector of the plurality of sectors; and
   scheduling in parallel, by each scheduler, at least some UEs that are associated with the corresponding different sector.

2. The method of claim 1 further comprising:
   identifying, by the network node, at least one UE of the plurality of UEs as a first multi-sector UE that is associated with multiple sectors of the plurality of sectors;
   identifying other UEs of the plurality of UEs as single-sector UEs that are each associated with a single sector of the plurality of sectors;
   wherein scheduling in parallel, by each scheduler, the at least some UEs that are associated with the corresponding different sector comprises:
      scheduling in parallel, by each scheduler, each single-sector UE of the plurality of UEs that is associated with the different sector that corresponds to said each scheduler.

3. The method of claim 2 further comprising scheduling the first multi-sector UE prior to scheduling in parallel, by each scheduler, each single-sector UE of the plurality of UEs that is associated with the different sector that corresponds to said each scheduler.

4. The method of claim 3 further comprising:
   identifying a second UE of the plurality of UEs as a second multi-sector UE that is associated with multiple sectors of the plurality of sectors; and
   sequentially scheduling the first multi-sector UE and the second multi-sector UE prior to scheduling in parallel, by each scheduler, each single-sector UE of the plurality of UEs that is associated with the different sector that corresponds to said each scheduler.

5. The method of claim 3 further comprising:
   identifying a second UE of the plurality of UEs as a second multi-sector UE that is associated with multiple sectors of the plurality of sectors, wherein the first multi-sector UE has a primary association with a first sector of the plurality of sectors, and the second multi-sector UE has a primary association with a second sector of the plurality of sectors; and
   scheduling in parallel, by the schedulers that correspond to the first sector and second sector, the first multi-sector UE and the second multi-sector UE.

6. The method of claim 5 wherein the first multi-sector UE has a secondary association with a third sector of the plurality of sectors, and the second multi-sector UE has a secondary association with a fourth sector of the plurality of sectors, and further comprising:
   determining that the first multi-sector UE has no association with any sector with which the second multi-sector UE has an association, and based on this determination, scheduling in parallel, by the schedulers that correspond to the first sector and the second sector, the first multi-sector UE and the second multi-sector UE.

7. The method of claim 3, wherein the first multi-sector UE has a primary association with a first sector and a secondary association with a second sector, and wherein scheduling the first multi-sector UE prior to scheduling in parallel, by each scheduler, each single-sector UE of the plurality of UEs that is associated with the different sector that corresponds to said each scheduler comprises:
   determining a first scheduling unit of a first scheduling unit group to allocate to the first multi-sector UE for uplink transmission, the first scheduling unit group corresponding to the first sector;
   marking the first scheduling unit as being allocated to the first multi-sector UE for uplink transmission;
   wherein a first scheduler of the plurality of schedulers corresponds to the first sector, and wherein scheduling in parallel, by each scheduler, each single-sector UE of the plurality of UEs that is associated with the different sector that corresponds to said each scheduler comprises accessing, by the first scheduler, the first scheduling unit group and determining that the first scheduling unit is not available for allocation to any single-sector UE.

8. The method of claim 7, further comprising:
   marking a second scheduling unit that corresponds to the first scheduling unit as being unavailable for allocation, the second scheduling unit being in a second scheduling unit group that corresponds to the second sector;
   wherein a second scheduler of the plurality of schedulers corresponds to the second sector, and wherein scheduling in parallel, by each scheduler, each single-sector UE of the plurality of UEs that is associated with the different sector that corresponds to said each scheduler comprises accessing, by the second scheduler, the second scheduling unit group and determining that the second scheduling unit is not available for allocation to any single-sector UE.

9. The method of claim 2, wherein identifying, by the network node, the at least one UE of the plurality of UEs as the first multi-sector UE that is associated with multiple sectors of the plurality of sectors comprises:
   determining, for the first multi-sector UE, a plurality of channel quality indicators, each channel quality indicator of the plurality of channel quality indicators being associated with a different sector and identifying a channel quality of the first multi-sector UE in the different sector;
   determining that a first channel quality indicator of the plurality of channel quality indicators that corresponds to a first sector of the plurality of sectors meets a channel quality criterion; and
   determining that a second channel quality indicator of the plurality of channel quality indicators that corresponds to a second sector of the plurality of sectors meets the channel quality criterion.

10. The method of claim 9, wherein identifying other UEs of the plurality of UEs as single-sector UEs that are each associated with a single sector of the plurality of sectors comprises:
  determining, for each single-sector UE, a plurality of channel quality indicators, each channel quality indicator of the plurality of channel quality indicators being associated with a different sector and identifying a channel quality of the each single-sector UE in the different sector; and
  determining that only a single channel quality indicator of the plurality of channel quality indicators meets the channel quality criterion.

11. The method of claim 10, wherein the channel quality indicators comprise filtered channel quality indicators.

12. The method of claim 2, further comprising prioritizing the plurality of UEs, and wherein scheduling in parallel, by each scheduler, the at least some UEs that are associated with the corresponding different sector comprises scheduling in parallel, by each scheduler, the at least some UEs that are associated with the corresponding different sector based on a priority associated with each of the at least some UEs.

13. The method of claim 1, further comprising concurrently processing each scheduler of the plurality of schedulers by a different processing unit of a plurality of processing units.

14. The method of claim 1 further comprising:
  determining an iteration schedule that identifies a scheduling instruction for each scheduler of the plurality of schedulers during each iteration of a plurality of iterations; and
  wherein scheduling in parallel, by each scheduler, the at least some UEs that are associated with the corresponding different sector further comprises:
  for each iteration of the plurality of iterations, performing by said each scheduler the scheduling instruction associated with said each scheduler in accordance with the iteration schedule.

15. The method of claim 14, wherein at least some of the scheduling instructions identify UEs to be scheduled for the respective iteration, and other of the scheduling instructions indicate no action is to be taken for the respective iteration.

16. The method of claim 14, further comprising for each iteration of the plurality of iterations, providing, by a sector synchronizer, the scheduling instruction to the each scheduler of the plurality of schedulers based on the iteration schedule.

17. The method of claim 14, further comprising:
  identifying, by the network node, each UE of the plurality of UEs either as a multi-sector UE that is associated with at least a primary sector and a secondary sector of the plurality of sectors, or as a single-sector UE that is associated with a single sector of the plurality of sectors; and
  wherein determining the iteration schedule that identifies the scheduling instruction for each scheduler of the plurality of schedulers during each iteration of the plurality of iterations comprises:
  for each multi-sector UE, generating a first scheduling instruction for the scheduler that corresponds to the primary sector of said each multi-sector UE to schedule said each multi-sector UE during a particular iteration, and generating a second scheduling instruction for the scheduler that corresponds to the secondary sector of said each multi-sector UE to take no action during the particular iteration.

18. A network node for scheduling uplink transmissions for a plurality of user equipment devices, UEs, comprising:
  a transceiver subsystem configured to communicate with the plurality of UEs; and
  a processing subsystem coupled to the transceiver subsystem, the processing subsystem comprising a plurality of processing units, and configured to:
  initiate a plurality of schedulers in parallel, each scheduler of the plurality of schedulers corresponding to a different sector of a plurality of sectors in a coverage area of the network node, each scheduler being processed by a different processing unit of the plurality of processing units; and
  schedule in parallel, by each scheduler, at least some UEs that are associated with the corresponding different sector.

19. The network node of claim 18, wherein the processing subsystem is further configured to:
  identify at least one UE of the plurality of UEs as a first multi-sector UE that is associated with multiple sectors of the plurality of sectors;
  identify other UEs of the plurality of UEs as single-sector UEs that are each associated with a single sector of the plurality of sectors; and
  wherein to schedule in parallel, by each scheduler, the at least some UEs that are associated with the corresponding different sector, the processing subsystem is configured to schedule in parallel, by each scheduler, each single-sector UE of the plurality of UEs that is associated with the different sector that corresponds to said each scheduler.

20. The network node of claim 19, wherein the processing subsystem is further configured to
  schedule the first multi-sector UE prior to scheduling in parallel, by each scheduler, each single-sector UE of the plurality of UEs that is associated with the different sector that corresponds to said each scheduler.

21. The network node of claim 20, wherein the processing subsystem is further configured to: identify a second UE of the plurality of UEs as a second multi-sector UE that is associated with multiple sectors of the plurality of sectors; and
  sequentially schedule the first multi-sector UE and the second multi-sector UE prior to scheduling in parallel, by each scheduler, each single-sector UE of the plurality of UEs that is associated with the different sector that corresponds to said each scheduler.

22. The network node of claim 19, wherein the processing subsystem is further configured to:
  identify a second UE of the plurality of UEs as a second multi-sector UE that is associated with multiple sectors of the plurality of sectors, wherein the first multi-sector UE has a primary association with a first sector of the plurality of sectors, and the second multi-sector UE has a primary association with a second sector of the plurality of sectors; and
  schedule in parallel, by the schedulers that correspond to the first sector and second sector, the first multi-sector UE and the second multi-sector UE.

23. The network node of claim 18, wherein the processing subsystem is further configured to:
  determine an iteration schedule that identifies a scheduling instruction for each scheduler of the plurality of schedulers during each iteration of a plurality of iterations; and
  wherein to schedule in parallel, by each scheduler, the at least some UEs that are associated with the corresponding different sector, the processing subsystem is further configured to:

for each iteration of the plurality of iterations, perform by said each scheduler the scheduling instruction associated with said each scheduler in accordance with the iteration schedule.

24. The network node of claim 23, wherein at least some of the scheduling instructions identify UEs to be scheduled for the respective iteration, and other of the scheduling instructions indicate no action is to be taken for the respective iteration.

25. The network node of claim 23, wherein the processing subsystem is further configured to:
  identify each UE of the plurality of UEs either as a multi-sector UE that is associated with at least a primary sector and a secondary sector of the plurality of sectors, or as a single-sector UE that is associated with a single sector of the plurality of sectors; and
  wherein to determine the iteration schedule that identifies the scheduling instruction for each scheduler of the plurality of schedulers during each iteration of the plurality of iterations, the processing subsystem is further configured to:
  for each multi-sector UE, generate a first scheduling instruction for the scheduler that corresponds to the primary sector of said each multi-sector UE to schedule said each multi-sector UE during a particular iteration, and generate a second scheduling instruction for the scheduler that corresponds to the secondary sector of said each multi-sector UE to take no action during the particular iteration.

* * * * *